UNITED STATES PATENT OFFICE.

FERDINAND FRITSCHE, OF RUMBURG, AUSTRIA-HUNGARY, ASSIGNOR TO THE FIRM OF STOLLE AND KOPKE, OF RUMBURG, AUSTRIA-HUNGARY.

SODIUM PERBORATE CONTAINING BORAX AND METHOD OF PRODUCING SAME.

No. 903,967.     Specification of Letters Patent.     Patented Nov. 17, 1908.

Application filed January 13, 1908. Serial No. 410,650. (Specimens.)

*To all whom it may concern:*

Be it known that I, FERDINAND FRITSCHE, a subject of the Emperor of Austria-Hungary, and resident of Rumburg, in the Empire of Austria-Hungary, merchant, have invented a new and useful Sodium Perborate Containing Borax and Method of Producing the Same, of which the following is an exact specification.

The present invention relates to the production of a substance containing easily liberated oxygen and the improved substance according to the present invention is a perborate of sodium containing borax.

In Jaubert's British specification No. 21387 of 1904 there is described a method of producing a boron and sodium compound from which oxygen is easily liberated which consists in mixing boric acid and sodium peroxid in the proportions of four molecules of the former to one of the latter. The following reaction takes place in this case:—

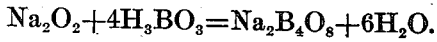

$$Na_2O_2 + 4H_3BO_3 = Na_2B_4O_8 + 6H_2O.$$

The product $Na_2B_4O_8 + 10H_2O$ which may be called perborax possesses 4% free or active oxygen. According to the present invention a product is obtained with a greater content of active oxygen and which is a true perborate containing borax. This result is obtained by allowing one molecule of sodium peroxid ($Na_2O_2$) to act on three molecules of boric acid ($H_3BO_3$). The reaction is as follows:—

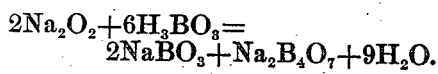

$$2Na_2O_2 + 6H_3BO_3 = 2NaBO_3 + Na_2B_4O_7 + 9H_2O.$$

The crystallized perborate containing borax $$2(NaBO_3 + 4H_2O)$$

and $$(Na_2B_4O_7 + 10H_2O)$$

possesses 4.6% of free oxygen, that is to say 15% more than the product according to Jaubert.

Another known method of producing an oxygen yielding substance with the formula $NaBO_3 - 4H_2O$ is to mix equal quantities of peroxid of sodium and boric acid. In this case the sodium not necessary for forming the perborate is taken up by the mineral acid. According to the present process the exact quantity of boric acid necessary for forming borax is used and in consequence the process is rendered simpler and cheaper.

Perborates are principally employed in the textile industry and the additional borax simultaneously produced according to the present invention does no harm. Moreover even the pure perborate leaves borax after it has given off its oxygen. The production of perborate according to my process however, has one very essential economical advantage because it enables me to again employ the lye remaining after each crystallization of the mixture of perborate and borax as part of the water employed for treating the next lot of boric acid and peroxid and in this way the quantity of water required for my process is very small in comparison with other proceedings.

In order to make my invention better understood I shall proceed to explain by way of example how it may be carried out in practice.

To 120 kilograms of water 25 kilograms of boric acid are added while stirring and the mixture is cooled down to 0° C. In this cooled mixture 10 kilograms of peroxid of sodium (92 per cent of $Na_2O_2$) are then gradually added in small portions and care must be taken to cool the mixture so that the temperature of reaction does not rise above 30° C. Shortly after the solution of the peroxid of sodium the crystallization begins, the mass is then cooled and the lye drawn off and separated from the crystals. The crystals are next dried at a temperature of about 30° C. The output of crystals in such a case amounts to 43 kilograms. The lye taken off and regained amounts to 80 kilograms which by addition of water is brought up to 120 kilograms and is used again as described above for treating the next lot of boric acid and peroxid. In these succeeding operations the output in crystallined substance and lye remains constant throughout.

The product of the above process is a white crystalline mass which may be sold in the form of a powder and its chief use in the art is as an oxygen carrier. It is non poisonous and when used in bleaching the residue left after treatment is also a harmless and non-poisonous substance.

I claim:—

1. The process of producing perborate of sodium containing borax consisting in treating peroxid of sodium with boric acid in the molecular proportions of 1:3 while the temperature is kept low, said reaction being carried out in the presence of water, crystallizing out the borax-containing perborate, substantially as described.

2. A borax-containing perborate having the formula $$(2NaBO_3 + 4H_2O) + (Na_2B_4O_7 + 10H_2O)$$

in the form of a white crystalline mass which acts as an oxygen carrier.

In witness whereof I have hereunto set my hand in the presence of two witnesses.

FERDINAND FRITSCHE.

Witnesses:
ADOLF ELGE,
FRANZ SIMON.